United States Patent [19]
Kucera

[11] 3,779,915
[45] Dec. 18, 1973

[54] ACID COMPOSITION AND USE THEREOF IN TREATING FLUID-BEARING GEOLOGIC FORMATIONS

[75] Inventor: Clare H. Kucera, Tulsa, Okla.

[73] Assignee: The Dow Chemical Company, Midland, Mich.

[22] Filed: Sept. 21, 1972

[21] Appl. No.: 290,888

Related U.S. Application Data

[63] Continuation-in-part of Ser. No. 138,775, April 29, 1971, abandoned, and a continuation-in-part of Ser. No. 701,821, Jan. 31, 1968, abandoned.

[52] U.S. Cl............ 252/8.55 C, 166/282, 166/283, 166/308, 252/8.55 R
[51] Int. Cl....................... E21b 43/26, E21b 43/27
[58] Field of Search ................. 252/8.55 R, 8.55 C; 166/282, 283, 308

[56] References Cited
UNITED STATES PATENTS

| | | | |
|---|---|---|---|
| 3,044,959 | 7/1962 | Martin | 252/8.55 |
| 3,153,450 | 10/1964 | Foster et al. | 166/308 X |
| 3,179,172 | 4/1965 | Reed et al. | 252/8.55 X |
| 3,281,354 | 10/1966 | Scott et al. | 252/8.55 |
| 2,824,833 | 2/1958 | Cardwell et al. | 252/8.55 |
| 3,252,904 | 5/1966 | Carpenter | 252/8.55 |

*Primary Examiner*—Herbert B. Guynn
*Attorney*—William M. Yates et al.

[57] ABSTRACT

A composition is provided which is especially useful as a fluid loss additive for acidic aqueous solutions. The composition is prepared by first mixing together an emulsifier, an oil soluble surfactant dispersing agent and a carrier oil. Clay particles are then dispersed in the mixture followed by an adhesive binder which functions to bind the clay particles together when screened out on a formation face.

8 Claims, No Drawings

ACID COMPOSITION AND USE THEREOF IN TREATING FLUID-BEARING GEOLOGIC FORMATIONS

CROSS-REFERENCE TO RELATED APPLICATION

This application is a continuation-in-part of patent application Ser. No. 138,775, filed Apr. 29, 1971 which in turn was a continuation of patent application Ser. No. 701,821, filed Jan. 3, 1968, both now abandoned.

BACKGROUND OF THE INVENTION

The invention pertains to a fluid-loss control additive which can be admixed with a well treating composition. It also relates to a well treating fluid and to an improved method of treating a geologic subterranean formation penetrated by a wellbore, wherein an aqueous treatment composition (e.g., fracturing, acidizing, etc.) is injected into the formation. The invention offers the advantage of providing a fluid-loss control agent which does not result in measurable formation damage. Further, the additive is stable in acidic solutions, is stable when left standing in containers for long periods of time and does not form strong emulsions with hydrocarbon oils, e.g., crude oil, etc.

In the treatment of a fluid-bearing geologic formation penetrated by a wellbore employing a liquid which is injected down the wellbore and forced back into the formation for the purpose of stimulating production, a problem long sought to be overcome is that of lessening the extent to which the injected fluid is lost or spent in the immediate vicinity of the wellbore. If the injected liquid can be made to travel a greater distance into the formation from the wellbore before being lost to the formation or spent beneficial results are obtained at greater distances from the wellbore. There is a resulting overall improvement in the producing stratum. By lost it is meant that the fluid flows off through more permeable zones instead of being directed to less permeable zones which need to be treated. By spent it is meant that the fluid reacts with the formation, i.e., acid with limestone.

The practice of the invention has a special significance in acidizing carbonate-containing strata. By employing the technique of the invention in acidizing operations, the fluid-loss control agent of the invention is impressed into the pores of the more exposed faces of the formation, thereby to impede excessive loss of fluids through connecting pores of the formation, such impeding causing the acidizing liquid to move along existing channels, fractures, or the like into more remote or less accessible portions of the formation. Further, the acid reaction rate is retarded.

Fully successful fluid-loss control agents or additives that may be employed under acid conditions have not been found. An agent which functions acceptably in an acid medium to divert and retard the reaction rate so that acid flows from permeable to less permeable zones in a high limestone content reservoir has been especially difficult to find.

SUMMARY OF THE INVENTION

The present invention is a composition of matter prepared by (a) mixing from about 7 to about 30 percent of at least one oil soluble surfactant and about 7 to about 30 percent of an anionic or nonionic emulsifier with a carrier oil; (b) mixing with (a) about 7 to about 30 percent of colloidal clay; and (c) mixing with the mixture of (a) and (b) about 7 to about 30 percent of an aqueous dispersion of an adhesive binder for said clay consisting of at least one of a water dispersible resin, rubber, or a natural gum, said adhesive binder comprising from about 25 to about 75 percent by weight of said aqueous dispersion. The four components, emulsifier, surfactant, clay and binder, are provided in a total amount of from about 50 to about 75 percent by weight of the carrier oil.

The aqueous dispersion (latex) of the adhesive binder is a material that has the property of imparting adhesive or tackiness to compositions in which it is present. The adhesive material provides the clay particles with an affinity for one another when screened out on a formation face. The classes of materials which are useful as an adhesive material include thermosetting resins, thermoplastic polymers, rubbers, gums and natural resins which adhere to and tend to bind clay particles together and are insoluble in oil and aqueous acid solutions. Particularly appropriate are such latices as a 25 percent to 75 percent total solids aqueous dispersion of polyvinyl chloride, polyvinyl acetate, polystyrene, neoprene, buatdiene-styrene, isobutylene, butyl, natural rubber latex, or dispersions of rosin acids (sometimes called resin acids).

The rosin acid adhesive binder is usually first admixed with water and the resulting dispersion stabilized by adding any suitable emulsifying agent, e.g., a protein matter such as casein. The dispersion is commonly "ammoniated," and decarboxylated to an acid number of between about 200 and 50, preferably between about 125 and 75, e.g., about 100. Rosin acids are largely abietic acid and related acids, e.g., sapietic, neobietic, isopimaric, pimaric, dehydroabietic and dihydroabietic. A detailed discussion of such rosin acids may be found in Gilman, *Organic Chemistry*, Vol. 4, pages 682 to 688 (1953) published by John Wylie and Sows, New York, N.Y. Such rosin acids are decarboxylated by known means to an acid number or acid value of not over about 200. (An acid number or value is the number of milligrams of KOH necessary to neutralize the carboxylic groups in one gram of an organic acidic substance.) "DRESINOL 42," procurable from the Hercules Powder Company is fully satisfactory for use in the practice of the invention as ingredient (c). It is a 40 percent solids, ammoniacal, protein-stabilized dispersion of a pale rosin, catalytically decarboxylated to an acid number of about 100.

Oil soluble surfactants which can be employed include for example fatty acids having from 10 to about 24 carbon atoms and tall oil acids and soaps thereof. The fatty acids present in tall oil are usually first saponified. The process of soap making employing tall oil fatty acids is described in the literature, e.g., pages 355 to 357 of *The Textbook of Organic Chemistry*, second edition, by Feiser & Feiser (1950), published by D. W. Heath and Co., Boston, or on pages 410 to 412, third edition (1956) published by Reinhold Publishing Corporation, New York, N. Y.

The anionic or nonionic emulsifier is any oil soluble type, well understood by that term in the art, e.g., as described in *Detergents and Emulsifiers D & E* 1963 *Annual*, published by John W. McCutcheon, 236 Mt. Kemble Avenue, Norristown, N. J. Suitable compounds include certain sulfonates, phenolic compounds, organic phosphorus compounds and phosphorus sulfide treated olefins such as those listed at Column 2, lines 25 through Column 4, line 75 of U. S. Pat. No. 2,779,735, said teachings being specifically incorporated by reference. Specific sulfonates include, for example, sodium dodecylbenzene sulfonate, or other sulfonates such as that procurable under the trademark Petrowet R. Another particularly suitable emulsifier to use is Dowfax 9 N30 which is an ethylene oxide nonylphenol condensation product. The compound acts as a dispersing agent for the clay particles.

Clay which is suitable for use in the practice of the invention may be any one or a mixture of lattice clay materials including kaolinite, montmorillonite, bentonite, illite, muscovite, chlorite, formiculite, sepiolite, polygorskite, or the like. Clay may be described as a finely particulated naturally occurring earthen material (usually of a colloidal particle size) that becomes plastic when wet (which is characteristic of a thixotropic material in the presence of sufficient water), and becomes substantially rigid but fragile when compacted and dried. A lattice clay is one in which the C axis spacing when saturated with water reaches a maximum greater than 25 Angstrom units. Clay is generally considered to consist of aluminum silicate hydrates and of various but usually lesser amounts of other hydrated silicates including those of iron, magnesium, calcium, potassium, sodium, and titanium. Minor amounts of nonclay materials are found in naturally occurring clay which do not prevent their use in the practice of the invention among which are fine particle sand, fossil fragments, carbonates and sulfates. The clay is employed having a size ranging from about −40 to +200 mesh (U.S. Standard Sieve).

The carrier oil may be selected from an oleaginous material of which the following are most commonly used: petroleum oil, crude petroleum, preferably of a relatively high API gravity, i.e., 5–100 centipoise and petroleum fractions such as naphtha, kerosene, diesel oil, refined gas oil, fuel oil or mixtures thereof. Oils other than petroleum oils such as $CCl_4$ and the like may be used but in general are impractical or uneconomical.

The invention is practiced by preparing the additive as follows: The preferred order of mixing is:

the surfactant, the anionic or nonionic emulsifier, and the carrier oil are admixed together, usually by first placing the oil, e.g., kerosene, in a suitable container equipped with a high speed stirrer and then admixing therewith the surfactant and emulsifier. Thereafter, the clay is admixed therewith with sufficient mixing to assure substantially complete coating of the clay with the surfactant. The aqueous adhesive binder dispersion, e.g., one or more decarboxylated stabilized rosin acids, or a suitable latex, is then mixed in to provide a stable suspension of the clay particles. It is recommended that the clay and the binder be added rather slowly while the contents of the vessel are being stirred vigorously. Stirring should be continued until a substantially uniform dispersion has been prepared.

The so prepared dispersion can then be admixed with an aqueous acid solution, e.g., 5 percent to 30 percent by weight aqueous HCl solution, in an amount of between 0.1 percent and 10 percent by weight of the aqueous acid solution, preferably between 1.0 to 5.0, based on the weight of the aqueous acid solution.

Thereafter, the aqueous acid solution containing the additive is injected down the wellbore and forced back into the formation being treated employing known injection means, using one or more high pressure pumps. In the embodiment of the invention wherein the formation is to be fractured, the injection rate is sufficiently great to cause a breakdown, e.g., cleavage of rock resulting in a fracture of the formation. If fracturing is not desired, e.g., matrix acidizing, then the pressures are maintained at some value below that at which fracturing occurs.

EXAMPLE 1

The following example is illustrative of the preparation of one embodiment of the invention:

A composition of the invention was prepared according to the following procedure: 1,088 pounds (160 gallons) of kerosene were placed in a 1,000-gallon tank equipped with a turbine mixer. With this were admixed 509 pounds (59 gallons) of a nonylphenol-ethylene oxide adduct emulsifier prepared by reacting 30 moles of ethylene oxide per mole of nonylphenol, and 506 pounds (67 gallons) of tall oil as a surfactant. There was then admixed with the contents of the tank, while maintaining high speed stirring, 445 pounds of substantially dry bentonite followed by 349 pounds (40 gallons) of a 40 percent aqueous dispersion of an ammoniacal rosin acid previously decarboxylated to an acid number of 100. This composition will be referred to as FLA.

The density of the resulting composition of the invention was 8.33 pounds/gallon. The composition so made is then admixed with aqueous acid or with other aqueous carrier liquid and injected down a wellbore penetrating a formation and into the formation whereby undesirable fluid loss to the formation is greatly inhibited.

The examples below show the efficacy of the composition of the invention to reduce the fluid loss of an aqueous solution to a geologic formation.

EXAMPLE 2

Portions of the composition prepared according to Example 1 were admixed in the amounts set out in Table I with a 15 percent by weight HCl aqueous solution containing 0.6 percent by weight of an inhibitor to corrosion defined in claim 1 of U. S. Pat. No. 3,077,454. The fluid loss properties were then obtained at 100 psi according to API RP 29, Section IV at 80° F. employing two No. 50 Whatman filter papers.

TABLE I

| % of FLA | Ml Fluid Loss in 25 Min. 15% HCl Solution | Water |
| --- | --- | --- |
| 0.5 | 28 | 35 |
| 1.0 | 16 | 29 |
| 2.0 | 14 | 16 |
| 3.0 | 11 | 15 |

Reference to the table shows that the FLA is effective in the amounts used since, in its absence, the fluid loss would have been at least about 500 ml in less than a minute. The larger amounts of FLA are more effective.

EXAMPLE 3

This example was conducted similarly to Example 2 to show the effect of temperature on the fluid loss control properties of FLA at 200° F. at varying pressures, when admixed with 15 percent aqueous HCl containing the same inhibitor to corrosion as Example 2.

TABLE II

| % FLA | Pressure in psi | Ml Fluid Loss in 25 Minutes |
|---|---|---|
| 1.0 | 500 | 23.5 |
| 1.2 | 500 | 19.5 |
| 1.5 | 500 | 10.5 |
| 1.0 | 1000 | 32.0 |
| 1.2 | 1000 | 35.0 |
| 1.5 | 1000 | 27.0 |
| 1.0 | 1500 | 50.0 |
| 1.2 | 1500 | 40.0 |
| 1.5 | 1500 | 25.0 |

Reference to Table II shows that the increased amounts of FLA were increasingly effective even at higher pressures and at the advanced temperature.

EXAMPLE 4

This example was conducted to show the direct applicability of the composition of the invention to fracture a subterranean formation.

These tests were conducted by admixing 1.2 percent by weight of FLA with water and testing its efficacy as a fluid loss control agent by passing the so-treated water through a 1-inch diameter, 1-inch long Berea sandstone core in a Hassler sleeve at a pressure of 1,000 psi at 80° F. and at 200° F. The results are shown in Table III. Comparative tests using a widely used and well known commercial fluid loss control agent are also shown in Table III.

TABLE III

| FLA or Commercial Fluid Loss Agent | Fluid in Ml Through Core in 25 Min. | Temp. in °F. |
|---|---|---|
| FLA | 8 | 80 |
| Commercial Fluid Loss Agent | 10 | 80 |
| FLA | 9 | 200 |
| Commercial Fluid Loss Agent | 18 | 200 |

Reference to Table III shows that the composition of the invention is very satisfactory to inhibit fluid passage through sandstone cores and accordingly useful in inhibiting fluid loss from aqueous fluids injected into geologic formations. It showed better results than those obtained using the conventional (presently widely used) fluid loss agent.

EXAMPLE 5

Tests within this example were made to show that various adhesive binding materials are satisfactory in practicing the invention. Various synthetic latices were admixed with tall oil, bentonite and an emulsifier. Some of the compositions were admixed with oil before being admixed with 15 percent by weight aqueous HCl and some were admixed directly with the aqueous HCl. The amount of the composition employed was 50 pounds per 1,000 gallons of acid. The fluid loss values in ml determined according to API RP 29 are shown in Table IV.

Reference to Table IV shows that various adhesive binders, e.g., latices, various emulsifiers, and either clay or asbestos cement may be admixed with the fatty acid and the resulting mixture either added directly to aqueous solutions or first mixed with a petroleum oil and then admixed with the aqueous solution to inhibit fluid loss.

EXAMPLE 6

In this example, various fluid loss control agents were prepared according to the procedure described in Example 1. Each composition contained 11 ml. of a nonylphenolethylene oxide adduct emulsifier, 9 ml. of a binder consisting of an (40 percent by weight solids content) aqueous dispersion of an ammoniacal rosin acid dicarboxylated to an acid number of 100, 15 ml. of tall oil as a surfactant and 36 ml. of kerosene. In each composition 12 grams of a different solid particulate material was employed. The various fluid loss compositions were dispersed in a 15 percent HCl aqueous solution and the fluid loss properties determined at 100 psi according to the test set forth in API RP 29, Section IV at 80° F. employing No. 50 Whatman filter paper. The solid materials consisted of diatomaceous earth, BaSO$_4$, slate flour, walnut shell four, ground silica and according to the practice of the present invention bentonite. None of the fluid loss agents except those containing bentonite resulted in fluid loss control as evidenced by the fact that the HCl solution flowed

TABLE IV

| Clay binder | Surfactant | Emulsifier | Clay | Kerosene | Amount added to 1,000 gal. of 15% HCl acid | Fluid loss in ml/25 min. |
|---|---|---|---|---|---|---|
| 1. 75 ml Saran latex | 100 ml tall oil | 100 ml ethylene oxidenonylphenol condensation product. | 50 grams | None | 50 lb | 14 |
| 2. 75 ml vinylidene chloride-vinyl chloride copolymer latex. | do | do | do | do | do | 20 |
| 3. 75 ml butadiene-styrene rubber latex. | do | do | do | do | do | 17 |
| 4. 90 ml polyvinyl acetate latex. | 75 ml tall oil | 75 ml ethylene oxide-nonylphenol condensation product. | 60 grams | 180 ml | 10 gal | 23 |
| 5. 9 ml Dresinol 42 | do | do | do | do | do | 18 |
| 6. 9 ml Dresinol 42 | 15 ml tall oil | 11 ml Petrowet R | 12 grams | 36 ml | 80 gal | 50 |
| 7. 9 ml Dresinol 42 | do | 11 ml ethylene oxide-nonylphenol condensation product. | 12 grams asbestos cement (instead of clay). | do | do | 25 | through the filter paper at about the same rate as when no fluid loss agent was employed. In the test employing the bentonite containing composition, only 11.5 ml. fluid loss after 25 minutes was recorded.

What is claimed is:

1. The product prepared by:
   a. mixing from about 7 to about 30 per cent by weight of an oil soluble surfactant selected from the group consisting of $C_{10}$ to $C_{24}$ fatty acids, soaps of such fatty acids and mixtures thereof with about 7 to about 30 per cent by weight of an oil soluble sulfonate or organic phosphorus compound-emulsifier or of an oil soluble nonionic emulsifier compound or mixture thereof and a petroleum carrier oil;
   b. mixing with (a) from about 7 to about 30 per cent by weight of particulate lattice clay; and
   c. mixing with (a) and (b) from about 7 to about 30 per cent by weight of an aqueous dispersion of a resin selected from the group consisting of ammoniacal protein-stabilized dispersion of rosin, catalytically decarboxylated to have an acid value of not greater than about 200, polyvinyl chloride latex, polyvinyl acetate latex, polystyrene latex, neoprene latex, butadiene-styrene rubber latex, polyisobutylene latex, butyl rubber latex, natural rubber or mixtures thereof as an adhesive binder for said clay, the per cents of said surfactant, emulsifier, adhesive and clay based on a total of 100 per cent by weight of these four components, said total weight of said four components comprising from about 50 to about 75 per cent by weight of said carrier oil.

2. The product of claim 1 wherein the adhesive binder is an ammoniacal protein-stabilized dispersion of rosin, catalytically decarboxylated to have an acid value of not greater than about 200.

3. The product of claim 1 wherein the emulsifier is the condensation product of a major molar proportion of ethylene oxide and a minor molar proportion of nonylphenol.

4. The product of claim 1 wherein the clay is bentonite.

5. An aqueous acid composition comprising:
   a fluid loss agent consisting essentially of from about 0.5 to about 10 per cent by weight of the product of claim 1 and the balance being an aqueous solution containing from about 5 to about 30 per cent by weight of HCl.

6. The composition of claim 5 wherein the product of claim 1 comprises from about 1 to about 5 percent by weight of said composition.

7. A method of acidizing a subterranean formation which is penetrated by a wellbore which comprises contacting said formation with the composition defined in claim 5.

8. The method of claim 7 wherein said acidizing treatment is carried out under pressure sufficient to fracture said formation.

* * * * *

UNITED STATES PATENT OFFICE
CERTIFICATE OF CORRECTION

Patent No. 3,779,915                    Dated 12/18/73

Inventor(s)    C.H. Kucera

It is certified that error appears in the above-identified patent and that said Letters Patent are hereby corrected as shown below:

Column 1, line 9, delete "January 3" and insert --January 31--.

Column 2, line 24, delete "buatdiene" and insert --butadiene--.

Column 2, line 39, delete "Sows" and insert --Sons--.

Column 6, line 40, delete "four" and insert --flour--.

Column 7, line 11, after "soluble" insert --anionic--.

Signed and sealed this 24th day of September 1974.

(SEAL)
Attest:

McCOY M. GIBSON JR.
Attesting Officer

C. MARSHALL DANN
Commissioner of Patents